(No Model.)
O. HACKETT.
TILT-UP FOR FISHING.
No. 446,596. Patented Feb. 17, 1891.
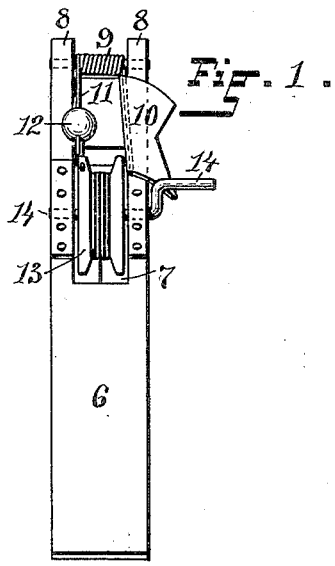
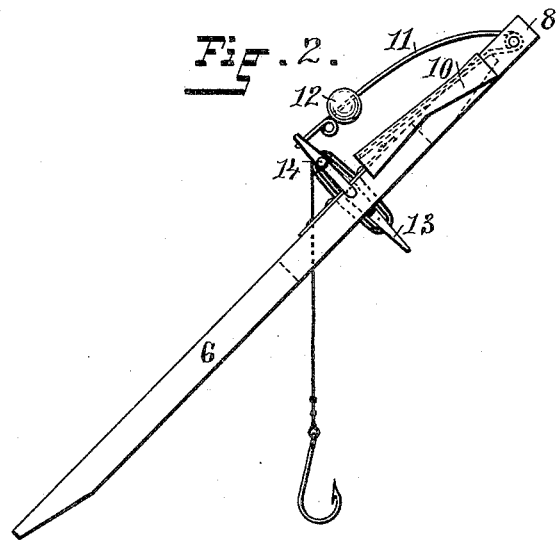
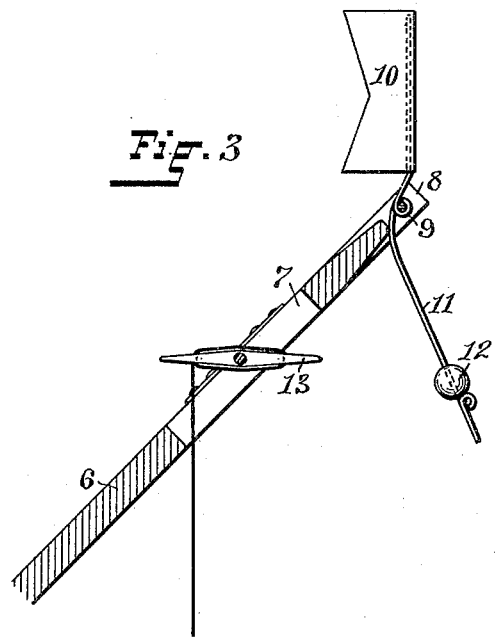
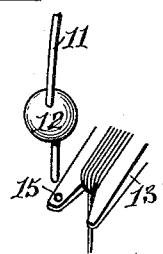
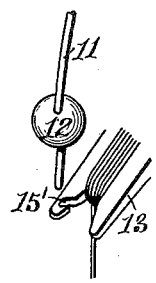
WITNESSES:
Henry J. Miller
Chas. H. Luther Jr.
INVENTOR:
Owen Hackett
by Joseph A. Miller & Co.
Attys

UNITED STATES PATENT OFFICE.

OWEN HACKETT, OF LYMANSVILLE, RHODE ISLAND.

TILT-UP FOR FISHING.

SPECIFICATION forming part of Letters Patent No. 446,596, dated February 17, 1891.

Application filed October 8, 1890. Serial No. 367,394. (No model.)

*To all whom it may concern:*

Be it known that I, OWEN HACKETT, of Lymansville, in the county of Providence and State of Rhode Island, have invented a new and useful Improvement in Tilt-Ups; and I hereby declare that the following is a full, clear, and exact description of the same, reference being had to the accompanying drawings, forming part of this specification.

This invention has reference to a tilt-up or indicating device used when fishing through ice, which automatically displays a flag when a fish is hooked.

The object of the invention is to produce a tilt-up which when operated will give a decided notification, by the display of a signal, of any pull on the line, and will allow the reel to be released and the line slacked at the same time. I attain these objects by the mechanism illustrated in the accompanying drawings, in which—

Figure 1 is a front view of the improved tilt-up, showing it as set. Fig. 2 is a side view of the same. Fig. 3 is a sectional view of the tilt-up, showing the signal-flag in the position indicating a pull on the line. Fig. 4 is a view of a portion of the reel and weighted spring-arm, showing one method of locking the same. Fig. 5 is a view of the same in which a slot is used for engaging the end of the weighted spring-arm.

The mechanism of the tilt-up is supported by the wooden standard 6, having a rectangular opening 7 and the projecting arms 8. Between the arms 8 the wood is somewhat beveled. A wire is passed through the projecting arms 8 to form a bearing for the spring 9, which has its opposite arms or ends elongated to form the flag-arm 10 on one side and the spring-arm 11 on the other side. To the arm 10 a small signal-flag is secured, and on the arm 11 a loosely-sliding weight 12 is placed and the arm bent one complete turn to form a stop. In the rectangular opening 7 is placed a small line-reel 13, having the hole or slot 15 cut in one of its projecting arms. The reel 13 is attached to the axle 14, one end of which is continued beyond the side of the standard to form a crank or handle for turning the reel. This axle 14 is secured to the standard by any suitable bearings.

The operation of the improved tilt-up is as follows: A short piece of fishing-line, with hook attached, having been wound upon the reel, the weighted spring-arm 11 is bent over toward the upper surface of the standard until it engages with the small hole or slot 15 in the end of the reel 13, the reel being at right angles with the standard, as shown in Fig. 2. In bringing the spring-arm in position to be locked the signal-arm 10 is brought down against the upper surface of the wooden standard 6. When a pull is exerted on the line, the reel 13 is gradually turned, disengaging the end of the spring-arm 11 from the hole or notch 15 in the reel, until the reel has been turned nearly on a line with the standard, when the spring-arm is released and flies around its axis, bringing the signal-flag to an upright position, as shown in Fig. 3, the weighted arm holding the flag in this position until the tilt-up is again set. When the reel 13 has been released from the spring-arm 11, the line is allowed to run out, giving the fish an amount of play depending on the length of the line.

In the locking device a small hole 15 may be bored through one end of the reel-arm, or the metal may be cut away from the inner part of the arm to form a notch or slot 15'.

Having thus described my invention, I claim as new and desire to secure by Letters Patent—

In a tilt-up, the combination, with the standard 6, having the rectangular opening 7, and the reel 13, revoluble therein on the axle 14, of the spring 9, pivotally secured between the projecting arms 8 8, furnished with the signal-arm 10, and weighted spring-arm 11, adapted to interlock with the notch 15 on the reel-arm, as described.

OWEN HACKETT.

Witnesses:
J. A. MILLER, Jr.,
HENRY J. MILLER.